United States Patent
Soting et al.

(10) Patent No.: US 6,313,437 B1
(45) Date of Patent: Nov. 6, 2001

(54) METHOD FOR ARC WELDING WITH MELTING ELECTRODE

(75) Inventors: Tor Soting, Hasselfors; Per Åberg, Laxå, both of (SE)

(73) Assignee: ESAB AB, Göteborg (SE)

( * ) Notice: Subject to any disclaimer, the term of this patent is extended or adjusted under 35 U.S.C. 154(b) by 0 days.

(21) Appl. No.: 09/380,686

(22) PCT Filed: Mar. 3, 1998

(86) PCT No.: PCT/SE98/00376

§ 371 Date: Sep. 17, 1999

§ 102(e) Date: Sep. 17, 1999

(87) PCT Pub. No.: WO98/39130

PCT Pub. Date: Sep. 11, 1998

(30) Foreign Application Priority Data

Mar. 3, 1997 (SE) .................................... 9700744

(51) Int. Cl.$^7$ .................................... B23K 9/095
(52) U.S. Cl. .............. 219/137 PS; 219/130.5; 219/137.71
(58) Field of Search .............. 219/130.5, 125.1, 219/125.11, 130.31, 130.32, 130.33, 137.71, 137 PS

(56) References Cited

U.S. PATENT DOCUMENTS

| 2,817,750 | 12/1957 | Jackson et al. . |
| 2,897,343 | * 7/1959 | Regnauld et al. ................ 219/130.5 |
| 3,253,118 | 5/1966 | Frederick . |
| 3,639,723 | 2/1972 | Keller et al. . |
| 3,686,465 | * 8/1972 | Urbanic .............................. 219/130.5 |
| 4,195,216 | 3/1980 | Beauchamp et al. . |
| 4,283,618 | 8/1981 | Jakob . |
| 4,443,687 | * 4/1984 | Toth ................................. 219/130.31 |
| 4,578,562 | 3/1986 | Lindström et al. . |
| 5,148,000 | * 9/1992 | Tews .............................. 219/125.11 |

FOREIGN PATENT DOCUMENTS 56-102380A  8/1981  (JP) .

* cited by examiner

Primary Examiner—Clifford C. Shaw
(74) Attorney, Agent, or Firm—Burns, Doane, Swecker & Mathis, L.L.P.

(57) ABSTRACT

The present invention relates to a method of controlling a welding power source and the associated wire feed arrangement intended for arc welding operations that employ a consumable electrode, to ensure crater filling at the end of the welding operation by means of fading of the arc voltage and of the wire feed rate, respectively. More particularly the invention relates to a method comprising arc voltage reduction at the onset of the end of the welding operation for a period that is considerably briefer than the total fading time, during which the arc voltage is reduced to a value below the value at which it is possible to weld during continuous welding and advancement in the joint with otherwise unchanged welding parameters, followed by a further reduction to a final value of arc voltage and fading of the wire feed rate simultaneously with the arc voltage fading to a final value of the wire feed rate.

21 Claims, 1 Drawing Sheet

METHOD FOR ARC WELDING WITH MELTING ELECTRODE

TECHNICAL FIELD

The present invention relates to a method in manual or automatic arc welding, of controlling the end of the welding process to ensure that the crater formed in the welding operation is minimised.

BACKGROUND

In arc welding, a depression forms in the molten pool from the pressure of the arc and the material transferred by the arc from the electrode to the work-piece. This depression is often referred to as the crater. At the end of the welding operation, this crater remains in the shape of an end crater. When the energy supply ceases abruptly at the end of the welding operation the molten material solidifies while shrinking. The solidification starts at the weld edges and progresses towards the centre. Particularly in the case of high-energy supply welding with consequential large molten pools, there is a deficiency of material in the centre of the molten pool as the molten material solidifies. As a result, a so called pipe forms, i.e. a hole extending vertically through the end crater. Often, this pipe also is the origin of fissures or cracks extending in the longitudinal direction of the welding bead. Welding defects of this nature impair the weld strength and for this reason various methods have been tested in order to eliminate the end crater.

It is known that in manual welding operations the welder often fills up the end crater by increasing the speed of advancement immediately prior to the end of the welding operation, whereupon he moves the gun back in the molten pool in order to thus produce the crater filling. The method puts considerable demands on the skill of the welder-and its repeatability is poor.

It is further known in automated arc welding to extinguish the arc for a programmed period of cooling and to thereafter re-ignite under reduced welding data conditions in order to produce the crater filling for a programmed filling period (U.S. Pat. No. 4,578,562). The method is time-consuming and disturbing welding spatter occurs in connection with the re-ignition.

It is finally known to successively reduce the size of the molten pool by continuously or in essentially equally large steps reduce the welding voltage and the wire feed rate, respectively. Particularly when the welding is performed under high energy supply in the spray transfer range, such as is the case in MIG/MAG welding, the welding data will, in the fading stage, pass through a range wherein considerable welding spatter and an uneven arc are produced.

OBJECT OF THE INVENTION

The object of the invention is to suggest a novel method in manual or automated arc welding operations that use a melting/consumable electrode, of controlling a source of welding current and the associated wire supply arrangement in a manner ensuring repeatable end-welding operations that in a minimum of time produce satisfactory crater-end filling without causing disturbing welding spatter.

This object is achieved in accordance with the teachings of the invention by fading the arc voltage and the wire feed rate, respectively, said fading comprising arc voltage reduction at the onset of the end of the welding operation for a period that is considerably briefer than the total fading time, during which the arc voltage is reduced to a value below the value at which it is possible to weld during continuous welding and advancement in the joint with otherwise unchanged welding parameters, followed by a further reduction to a final value of arc voltage and fading of the wire feed rate simultaneously with the arc voltage fading to a final value of the wire feed rate. Because the supplied heat is reduced rapidly at the onset of the end of the welding operation while simultaneously more material is supplied, the molten pool is cooled and the size of the molten material is reduced without disturbing welding spatter being generated, since the difficult-to-weld globular transfer range is traversed in a much briefer period of time. In this manner, the end of the welding operation thus becomes very brief and the crater filling satisfactory.

Advantageous modifications of this method are defined in the dependent claims.

According to a further aspect of the invention only the fading time and the arc voltage end values and/or the wire feed rate are adjustable parameters. This simplifies handling and reduces the time consumption further.

DESCRIPTION OF PREFERRED EMBODIMENTS

For exemplifying purposes, the invention will be described in more detail in the following with reference to the accompanying drawings.

The invention is concerned with the end of a welding operation wherein arc voltage and feed rate are faded during a weld finishing period, i.e. are reduced, to a minimum value at which the welding operation is interrupted.

In accordance with the invention an initial arc voltage reduction is effected in the initial stage of the end of the welding operation for a period that is considerably shorter than the total fading period, whereupon a further reduction is effected until a final arc-voltage value is obtained. At the same time also the wire feed rate is faded to a final value, simultaneously with the arc-voltage fading. The latter fading of the wire feed rate preferably is continuous or divided into essentially equal steps.

Figure 1:
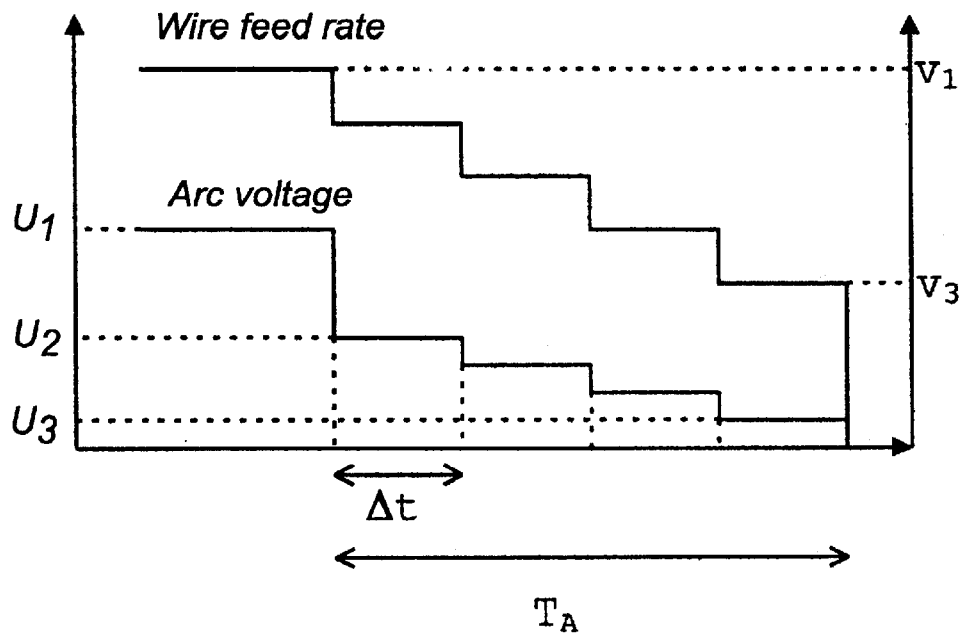
FIG. 1 is a schematic diagram of arc voltage fading and wire feed rate at the end of a welding operation in accordance with the invention.

In accordance with a first embodiment, illustrated in FIG. 1, the fading of the wire feed rate v as well as of the arc voltage U are carried out in steps. The end off the welding operation continues for a fading time $T_A$ which in this case is divided into four steps $\Delta t$. The wire feed rate then is lowered from $v_1$ to $v_3$ in essentially equally large steps. Simultaneously, the arc voltage is lowered from $U_1$ to $U_3$ but in this case the initial step from $U_1$ to $U_2$ is considerably larger than the subsequent step.

In this manner the initial arc-voltage reduction occurs quicker than does the subsequent, further reduction, inasmuch as the mean reduction of the arc voltage during the period of the first step exceeds that during subsequent step periods.

The number of steps is four in accordance with this embodiment, but the number of steps could be different without departing from the object of the invention.

Figure 2:
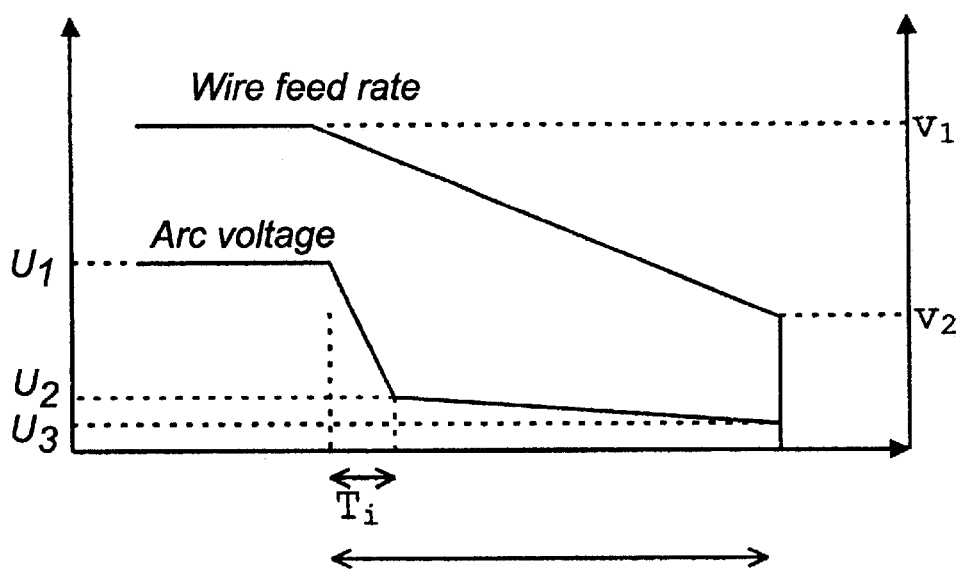
FIG. 2 is a schematic diagram of alternative fading in accordance with the invention.

A special case is the one when the number of steps approaches infinity, i.e. when $\Delta t$ approaches zero. In this case continuous fading is obtained. This special case is shown in FIG. 2. the wire feed rate is faded continuously linearly from $v_1$ to $v_3$. At the same time, arc voltage exhibits a steep decline from $U_1$ to $U_2$ during an initial period $T_i$ of fading time $T_A$, thereafter a flatter fading from $U_2$ to $U_3$ for the remainder of the fading time $T_A$.

The initial arc voltage reduction is of such a magnitude that it is lowered to a value below the value at which it is possible to weld during continuous welding and advancement in the joint with otherwise unchanged welding parameters. In this case, welding operations are, however, still feasible also at this low arc voltage, since the end of the welding operation involves welding of an already heated area, which requires less energy than in the case of welding of cool surfaces. With the aid of the initial arc voltage reduction a very rapid transfer is achieved from the spray transfer range to the short-arc range (dip transfer range) through the globular transfer range where the arc is unstable. This means that the size of the molten pool may be reduced rapidly.

The initial arc voltage reduction still preferably is performed for briefer periods than 150 milliseconds, and concerns fading corresponding to between 50 and 75 percent of the total fading. The total crater filling time involving crater filling in accordance with the invention preferably is between 0.5 and 3 seconds.

The method in accordance with the invention preferably is intended to be used in gas metal arc welding (MIG/MAG) but the method is equally applicable in connection with other types of arc welding methods employing a melting/consumable electrode.

In accordance with a further aspect of the present invention the only adjustable parameters are the fading time and the end values of arc voltage and/or wire feed rate. It is further possible to arrange for fixed relations between these parameters for use within a vast adjustment range concerning other parameters, i.e. within an extensive current range. In this manner the operator is given an opportunity to perform an excellent crater filling operation while the requirements on precise parameter adjustment are minimised.

What is claimed is:

1. A method of controlling a welding power source and an associated wire feed arrangement intended for arc welding operations that employ a consumable electrode, to ensure crater filling at the end of the welding operation by means of fading of the arc voltage and of the wire feed rate, respectively, comprising the steps of:

a first arc voltage reduction at the onset of the end of the welding operation for a period that is shorter than the total fading time, wherein during which period the arc voltage is reduced to a value below the value at which it is possible to weld during continuous welding and advancement in the joint with otherwise unchanged welding parameters, followed by a second arc voltage reduction to a final value of arc voltage and fading of the wire feed rate, simultaneously with the arc voltage fading, to a final value of the wire feed rate, wherein a time rate of change of the voltage during the second arc voltage reduction is lower than during the first arc voltage reduction.

2. A method as claimed in claim 1, characterised by performing the initial arc-voltage reduction for a period briefer than 150 milliseconds.

3. A method as claimed in claim 2, characterised in that the initial arc-voltage reduction is between 50 and 75 percent of the total fading.

4. A method as claimed in claim 3, characterised in that the welding process is a gas metal arc welding process (MIG/MAG).

5. A method as claimed in claim 4, characterised in that the fading time is between 0.5 and 3 seconds.

6. A method as claimed in claim 3, characterised in that the fading time is between 0.5 and 3 seconds.

7. A method as claimed in claim 2, characterised in that the welding process is a gas metal arc welding process (MIG/MAG).

8. A method as claimed in claim 7, characterised in that the fading time is between 0.5 and 3 seconds.

9. A method as claimed in claim 2, characterised in that the fading time is between 0.5 and 3 seconds.

10. A method as claimed in claim 2, characterised in that only the fading time and one of the end values of the arc voltage and the wire feed rate are adjustable parameters.

11. A method as claimed in claim 1, characterised in that the initial arc-voltage reduction is between 50 and 75 percent of the total fading.

12. A method as claimed in claim 11, characterised in that the welding process is a gas metal arc welding process (MIG/MAG).

13. A method as claimed in claim 12, characterised in that the fading time is between 0.5 and 3 seconds.

14. A method as claimed in claim 11, characterised in that the fading time is between 0.5 and 3 seconds.

15. A method as claimed in claim 11, characterised in that only the fading time and one of the end values of the arc voltage and the wire feed rate are adjustable parameters.

16. A method as claimed in claim 1, characterised in that the welding process is; a gas metal arc welding process (MIG/MAG).

17. A method as claimed in claim 16, characterised in that the fading time is between 0.5 and 3 seconds.

18. A method as claimed in claim 16, characterised in that only the fading time and one of the end values of the arc voltage and the wire feed rate are adjustable parameters.

19. A method as claimed in claim 1, characterised in that the fading time is between 0.5 and 3 seconds.

20. A method as claimed in claim 19, characterised in that only the fading time and one of the end values of the arc voltage and the wire feed rate are adjustable parameters.

21. A method as claimed in claim 1, characterised in that only the fading time and one of the end values of the arc voltage and the wire feed rate are adjustable parameters.

* * * * *